(12) United States Patent
Walker et al.

(10) Patent No.: US 9,294,932 B2
(45) Date of Patent: Mar. 22, 2016

(54) APPARATUS AND METHOD FOR WIRELESS NETWORK ENHANCEMENT VIA VARIABLE DOWN TILT

(75) Inventors: Gordon Kent Walker, San Diego, CA (US); Matthew Stuart Grob, San Diego, CA (US); Jun Wang, San Diego, CA (US); Xiaoxia Zhang, San Diego, CA (US); Ernest Tadashi Ozaki, San Diego, CA (US); Allen Minh-Triet Tran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 815 days.

(21) Appl. No.: 13/553,401

(22) Filed: Jul. 19, 2012

(65) Prior Publication Data
US 2013/0021204 A1  Jan. 24, 2013

Related U.S. Application Data

(60) Provisional application No. 61/510,351, filed on Jul. 21, 2011.

(51) Int. Cl.
| | |
|---|---|
| *H04W 16/28* | (2009.01) |
| *H04W 4/06* | (2009.01) |
| *H01Q 25/00* | (2006.01) |
| *H04W 72/00* | (2009.01) |

(52) U.S. Cl.
CPC ............... *H04W 16/28* (2013.01); *H04W 4/06* (2013.01); *H04W 72/005* (2013.01)

(58) Field of Classification Search
CPC ..... H04W 16/28; H01Q 25/00; H01Q 25/002
See application file for complete search history.

(56) References Cited

U.S. PATENT DOCUMENTS

| | | | | |
|---|---|---|---|---|
| 5,818,385 A * | 10/1998 | Bartholomew | ............ | 342/372 |
| 6,239,744 B1 * | 5/2001 | Singer et al. | ............ | 342/359 |
| 6,366,237 B1 * | 4/2002 | Charles | ............ | 342/368 |
| 6,492,942 B1 * | 12/2002 | Kezys | ............ | 342/368 |
| 6,549,529 B1 * | 4/2003 | Drabeck et al. | ............ | 370/347 |
| 7,242,362 B2 * | 7/2007 | Hulkkonen et al. | ............ | 343/853 |
| 7,505,010 B2 | 3/2009 | Franzon et al. | | |
| 8,175,532 B2 | 5/2012 | Nanda et al. | | |
| 2003/0153361 A1 * | 8/2003 | Mori et al. | ............ | 455/562 |

(Continued)

FOREIGN PATENT DOCUMENTS

| | | |
|---|---|---|
| EP | 1 026 778 A2 | 8/2000 |
| EP | 2 363 918 A1 | 9/2011 |

(Continued)

OTHER PUBLICATIONS

International Search Report and Written Opinion—PCT/US2012/047598—ISA/EPO—Nov. 14, 2012.

(Continued)

*Primary Examiner* — Gregory C Issing
(74) *Attorney, Agent, or Firm* — Arent Fox LLP

(57) ABSTRACT

Apparatus and methods for controlling antenna down tilt in a mixed coordinated/non-coordinated network include receiving one or more input signals defining a waveform to be transmitted, for determining a tilt angle state to be applied to the antenna based on the one or more input signals, and for transmitting a tilt control signal if the determined tilt angle state differs from a current tilt angle state associated with the antenna.

48 Claims, 13 Drawing Sheets

(56) References Cited

U.S. PATENT DOCUMENTS

| | | |
|---|---|---|
| 2006/0183503 A1 | 8/2006 | Jeffrey Goldberg et al. |
| 2009/0058725 A1* | 3/2009 | Barker et al. ............. 342/372 |
| 2009/0280866 A1* | 11/2009 | Lo ..................... H01Q 25/00 455/562.1 |
| 2010/0060522 A1* | 3/2010 | Backlund et al. .......... 342/372 |
| 2010/0159930 A1 | 6/2010 | Hagerman et al. |
| 2011/0261773 A1 | 10/2011 | Nogami |
| 2011/0319110 A1 | 12/2011 | Futaki |

FOREIGN PATENT DOCUMENTS

| | | |
|---|---|---|
| JP | 2000/269723 A | 9/2000 |
| JP | 2005/109690 A | 4/2005 |
| JP | 2010/514338 A | 4/2010 |
| WO | WO-2007/146685 A1 | 12/2007 |
| WO | WO 2008/040143 A1 | 4/2008 |
| WO | WO-2008/079065 A1 | 7/2008 |
| WO | WO-2010/055749 A1 | 5/2010 |

OTHER PUBLICATIONS

Nokia Siemens Networks et al: "MCCH Hierarchy and Transmission Modes", 3GPP Draft; R2-073082 MCCH Hierarchy, 3rd Generation Partnership Project (3GPP), Mobile Competence Centre; 650, Route Des Lucioles ; F-06921 Sophia-Anti Polis Cedex; France, vol. RAN WG2, Meeting #59, Athens, Greece; Aug. 15, 2007, XP050135814, [retrieved on Aug. 15, 2007] p. 3, line 1-line 6.

* cited by examiner

| Transmission Simulation Case | Max Data Rate, 1% BLER 95% coverage, no down tilt (coordinated tilt angle) (Mbps) | Max Data Rate, 1% BLER 95% coverage, with non-coordinated down tilt (Mbps) | Non-coordinated Ant. Down Tilt (degrees) |
|---|---|---|---|
| Band 13 | | | |
| Dense Urban | 15.3 | 14.1 | 5.6 |
| Urban | 7.7 | 6.5 | 5.5 |
| Suburban | 5.0 | 4.0 | 5.1 |
| Rural | 13.5 | 12.6 | 3.7 |
| 3GPP | | | |
| D1 | 15.8 | 11.5 | 15 |
| D3 | 3.1 | 2.2 | 6 |
| Band 20 | | | |
| Dense Urban | 15.8 | 15.8 | 8 |
| Urban | 15.2 | 13.5 | 8 |
| Suburban | 15.8 | 15.2 | 4 |
| Rural | 15.8 | 15.8 | 5 |
| AWS | | | |
| Dense Urban | 9.1 | 8.0 | 3.2 |
| Urban | 2.2 | 1.8 | 3.1 |
| Suburban | 0.9 | 0.9 | 2.7 |
| Rural | 7.7 | 7.7 | 1.3 |
| ATT | | | |
| Dense Urban | 15.8 | 15.8 | 10 |

*FIG. 12*

APPARATUS AND METHOD FOR WIRELESS NETWORK ENHANCEMENT VIA VARIABLE DOWN TILT

CLAIM OF PRIORITY UNDER 35 U.S.C. §119

The present application for patent claims priority to Provisional Application No. 61/510,351 entitled "Apparatus and Method for Wireless Network Enhancement Via Variable Down Tilt" filed Jul. 21, 2011, and assigned to the assignee hereof and hereby expressly incorporated by reference herein.

BACKGROUND

1. Field

This application relates generally to improving network capacity in a wireless network.

2. Background

Unicast networks are typically optimized for unicast capacity in a serving cell. Since signals from adjacent cells are potentially interfering for systems such as long term evolution (LTE) and wideband code division multiple access (WCDMA), the base stations are configured to minimize interference of the service supporting cell as compared to a potentially interfering neighboring cell.

Among the techniques used to minimize unicast interference is down tilt. Down tilt refers to the angle of the peak of a main beam of a transmitted signal relative to the horizon. Multi-cast broadcast single frequency network (MBSFN) is a technique to enhance the received signal-to-noise ratio (SNR), and therefore the coverage or supported bit rate in a broadcast system. With single frequency network (SFN) transmissions, neighboring cells may transmit useful signals rather than signals that result in interference to the serving cell transmission. Because neighboring cells are co-operating rather than interfering, broadcast networks tend to operate with one or perhaps two degrees of down tilt, whereas the unicast networks are often operated with several more degrees of down tilt.

Multi-point unicast transmission has been introduced to enhance unicast performance. With multi-point transmission, multiple cells (including macros, picos and remote radio head (RRH), etc.) may coordinate with each other and transmit data jointly to the same user in a synchronized manner. In this case, the down tilt associated with joint transmission can be different (potentially decreased) from the down tilt for a unicast transmission sent from a single cell.

Some prior solutions utilize diurnal variation of down tilt within a unicast network. However, this sort of tilt variation is in general related to diurnal variation in traffic loading. A key aspect of this use of down tilt variation is the speed at which the variation of down tilt is accomplished. Specifically, the frequency of change for the typical diurnal variation is a few times each day. Accordingly, these solutions do not address transmissions in a wireless network where the frequency of change between a broadcast/unicast single frequency transmission and a unicast multi-point transmission TDM application may be many times per second.

Thus, improved network capacity in a wireless network is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method for controlling antenna down tilt in a wireless network includes receiving one or more input signals defining a waveform to be transmitted, for determining a tilt angle state to be applied to the antenna based on the one or more input signals, and for transmitting a tilt control signal if the determined tilt angle state differs from a current tilt angle state associated with the antenna.

In other related aspects, a computer readable medium may have at least one instruction executable by a computer to perform the acts of the above-noted method, an apparatus may include at least one means for performing the acts of the above-noted method, and an apparatus may include at least one processor for performing the acts of the above-noted method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 12 is a table of simulation results where a higher data capacity is achieved by adjusting between different tilt angles for single frequency network transmissions and multi-frequency network transmissions according to the described apparatus and methods.

DETAILED DESCRIPTION

Figure 1:
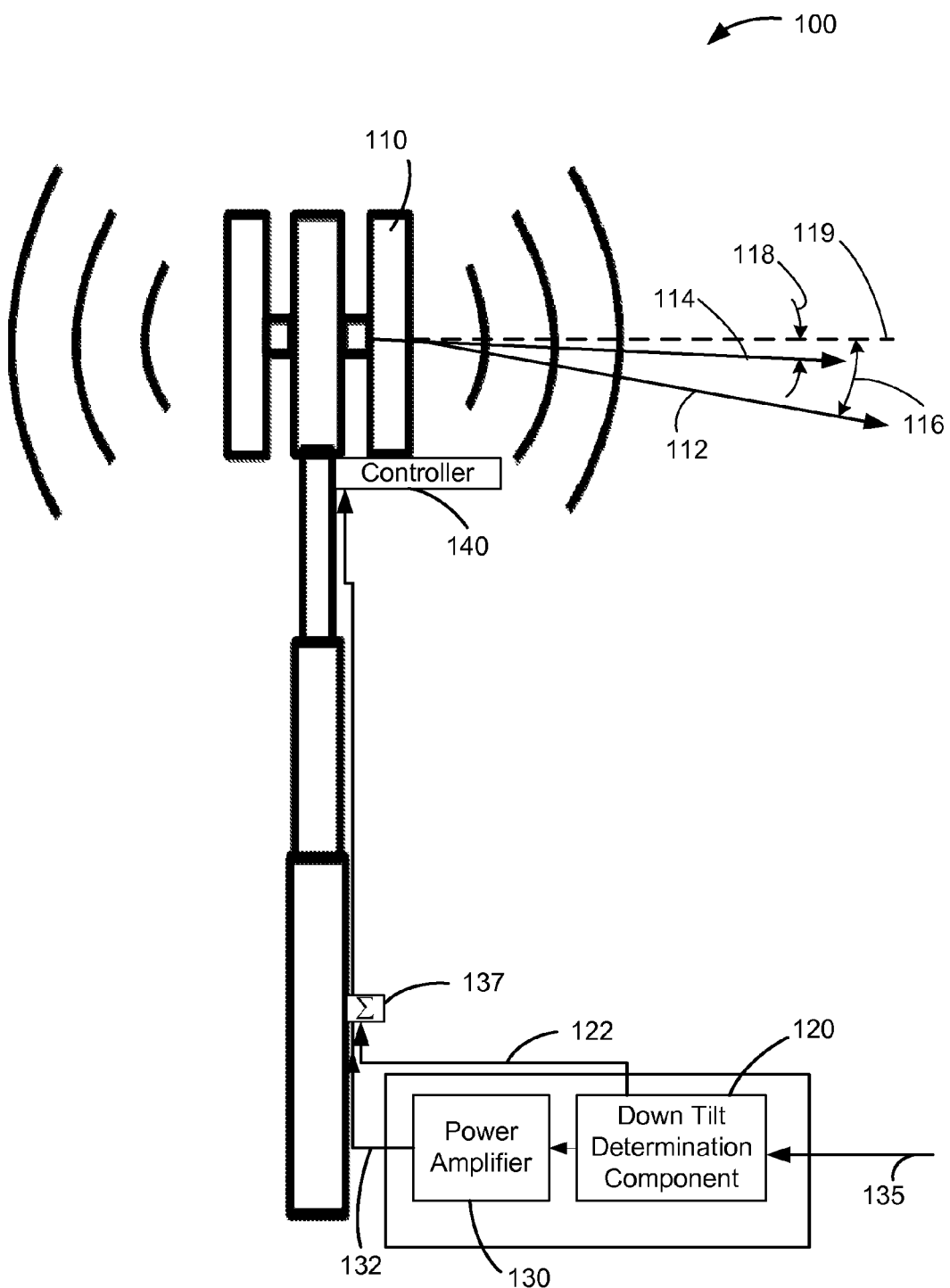
FIG. 1 is a schematic diagram of an aspect of an apparatus for controlling antenna down tilt, as described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As will be described in detail herein, methods and apparatus for controlling antenna down tilt in a wireless network are provided. As used herein, the phrase "mixed coordinated/non-coordinated" network relates to any communications network, or base station or eNodeB, having transmissions that include a mix of coordinated transmissions and non-coordinated transmissions. As used herein, coordinated transmissions refer to transmissions wherein more than one cell coordinates to transmit signals to a UE. Coordinated transmissions may include, for example, broadcast transmissions and multi-cell unicast transmissions. Non-coordinated transmissions, as used herein, refer to transmission wherein the best server is chosen for transmitting information such as, for example, single-cell unicast transmissions. In other words, a mixed coordinated/non-coordinated network includes a base station or eNodeB that mixes the transmission of coordinated signals with the transmission of non-coordinated signals that are not synchronized with, and thus may interfere with, transmissions from other adjacent base stations or eNodeBs. Further, in some aspects, a base station or eNodeB in a mixed coordinated/non-coordinated network may switch between coordinated and non-coordinated transmissions many times per second.

When input signals are received at a base station, the base station determines a tilt angle state to be applied to the antenna based on the one or more input signals. If the determined tilt angle state differs from the current tilt angle state of the antenna, then the base station transmits a tilt control signal to an antenna controller for adjusting the down tilt state of the antenna. In an aspect, the control signal may vary a phase and/or an amplitude of a portion of the transmitted waveform to achieve the desired tilt angle, i.e. the down tilt, corresponding to the determined tilt angle state. For example, the tilt angle state may vary based on a type of waveform to be transmitted. As such, in some aspects, the base station may determine the type of waveform to be transmitted (e.g., a non-coordinated transmission such as a single-cell unicast waveform, or a coordinated transmission such as a multi-cell unicast or a broadcast waveform) based on the input signals, and thereby determines the antenna tilt angle state to be used for transmitting the waveform. In another aspect, the tilt angle state may be determined from an explicit indication in the one or more input signals of the tilt angle state. In any case, the described methods and apparatus dynamically change the down tilt angle of the antenna, potentially many times per second, based on the input signals defining the waveform to be transmitted. Accordingly, in an aspect, apparatus and methods that operate in a mixed coordinated/non-coordinated network according to the principles described herein may have improved network capacity.

Figure 2:
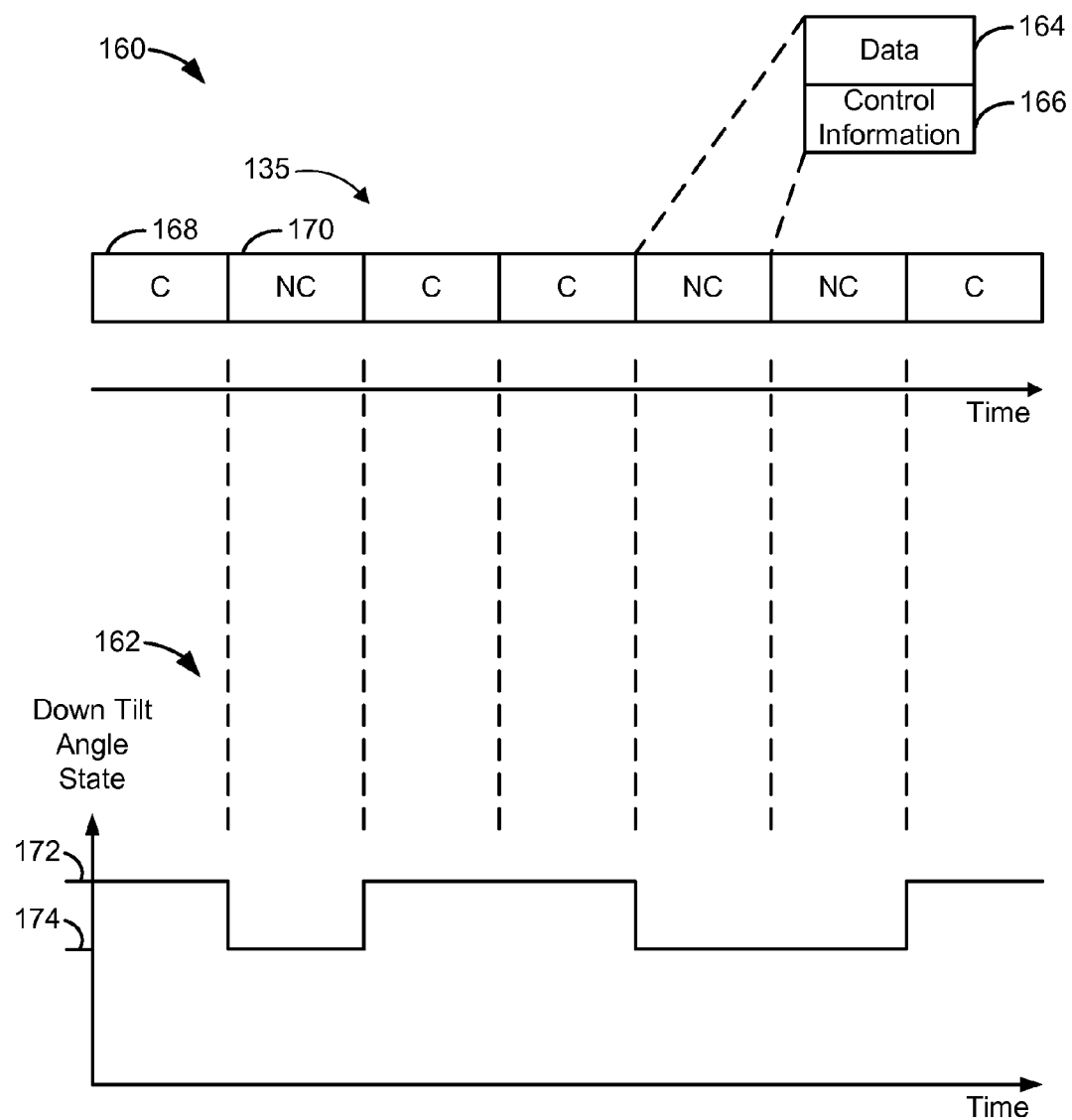
FIG. 2 is a graph of an aspect of one or more input signals and corresponding down tilt angle states over time according to the aspects of FIG. 1.

Referring to FIGS. 1 and 2, a high-level block diagram depicting a system for controlling transmit antenna down tilt based on input signals that define a waveform to be transmitted includes a base station or eNodeB 100 having an antenna 110 configured to transmit both non-coordinated signals 112, such as a unicast signal, and coordinated signals 114, such as a broadcast signal or a multi-cell unicast signal. As such, base station or eNodeB 100 may form or be part of a mixed coordinated/non-coordinated communications network. A non-coordinated signal down tilt angle 116 may be defined representing the angle between the horizon 119 and a peak of a main beam of the non-coordinated signal 112. Similarly, a coordinated down tilt angle 118 may be defined representing the angle between the horizon 119 and a peak of a main beam of the coordinated signal 114. Antenna 110 may comprise an antenna array having multiple antenna radiating elements. A down tilt determination component 120 and power amplifier 130 may form part of base station or eNodeB 100 that receives one or more input signals 135 defining a waveform to be transmitted via antenna 110. Down tilt determination component 120 may be configured to determine a tilt angle state corresponding to a tilt angle to be applied to at least a portion of the antenna based on the one or more input signals 135 defining the waveform to be transmitted. For example, the one or more input signals 135 may define the waveform to be a non-coordinated waveform, such as a single-cell unicast signal, or a coordinated waveform such as a multi-cell unicast signal or a broadcast signal, etc., or a sequence of such signals. Down tilt determination component 120 may then identify a down tilt state corresponding to down tilt angle for the waveform, such as but not limited to non-coordinated signal down tilt angle 116 or coordinated signal down tilt angle 118.

In an aspect, for example referring to the input signal over time diagram 160 and the down tilt angle state over time diagram 162 of FIG. 2, the one or more input signals 135 may include data 164 to be transmitted as well as control information 166 defining the type of physical layer waveform upon which the data is to be transmitted. Down tilt determination component 120 may output at least a portion of the one or more input signals 135 to power amplifier 130, which in turn outputs an amplified radio frequency (RF) signal 132 corresponding to the waveform to be transmitted. Down tilt determination component 120 may also output a tilt control signal 122, which controls a title angle, e.g. the down tilt, of antenna 110, based on the one or more input signals 135. Tilt control signal 122 and RF signal 132 may be combined, such as at summing component 137, and sent to an antenna controller 140. In some aspects, the tilt control signal 122 may be transmitted over a dedicated optical control interface or a dedicated electrical control interface. In other aspects, the tilt control signal 122 may be transmitted over an existing radio frequency (RF) cable connected to the antenna 110. Antenna controller 140 may then adjust one or more antenna coefficients in accordance with the tilt control signal 122. For example, antenna controller 140 may adjust one or more antenna coefficients of one or more radiating elements of antenna 110 such that the phase and/or amplitude of the radiated signal, e.g. non-coordinated signal 112 or coordinated signal 114, is adjusted, thereby adjusting the down tilt angle, e.g. down tilt angle 116 or down tilt angle 118. Further, based on the operation of down tilt determination component 120 in these described aspects, the down tilt angle, e.g. down tilt angle 116 or down tilt angle 118, of antenna 110 may vary over time depending upon the waveform to be transmitted. For example, the down tilt angle may change a plurality of times within an hour, a minute, or even a second or less than a second. For example, referring to FIG. 2, input signal 135 defines a sequence of mixed coordinated waveforms (C) 168 and non-coordinated waveforms (NC) 170 for transmission by antenna 110. Corresponding values 172 and 174 of the down tilt angle state vary depending upon the whether the waveform to be transmitted at a given time is coordinated or non-coordinated waveform. It should be noted that although FIG. 2 illustrates a single tilt angle state 172 or 174 corresponding to coordinated or non-coordinated waveforms 168 and 170, each type of waveform may correspond to more than one tilt angle state. For instance, a type of waveform, e.g. coordinated 172 or non-coordinated 174, may have different tilt angle states (and hence tilt angles) during different times of the day, or different subtypes of the same type of waveform, e.g. coordinated for unicast versus coordinated for broadcast, may have different tilt angle states (and hence tilt angle), for example, based on a respective size of the corresponding network, or some combination of both. Also, different coordinated unicast transmissions may involve different numbers of cells. For example, a first coordinated unicast transmission may involve two cells while a second coordinated unicast transmission may involve four cells. Each different coordinated unicast transmission may have different tilt angle states (and hence different tilt angles) based on the number of cells. Moreover, the selection of a tilt angle state may be based on the locations/geometry of the UE to receive the transmission.

Figure 3A:
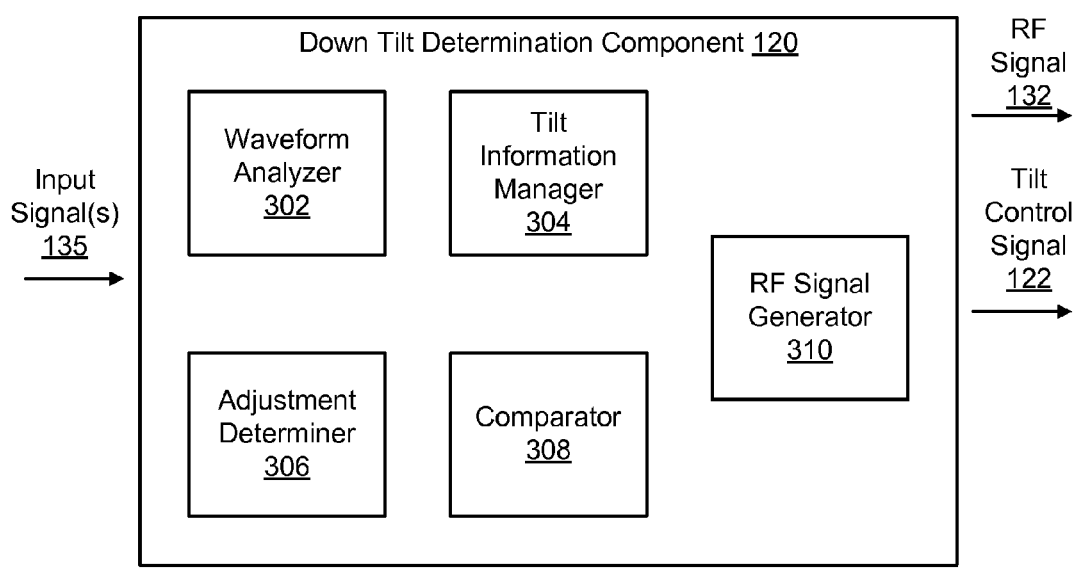
FIG. 3A is a schematic block diagram of an aspect of a down tilt determiner component.

FIG. 3A depicts down tilt determination component 120 in greater detail. For example, down tilt determination component 120 may include a waveform analyzer 302, a tilt information manager 304, an adjustment determiner 306, and a comparator 308 that work in conjunction to analyze the one or more input signals 135 and generate tilt control signal 122 to control antenna down tilt. Further, down tilt determination component 120 includes an RF signal generator 310 that receives the one or more input signals 135, applies a waveform generation function based on the waveform defined by the one or more input signals 135, and outputs RF signal 132, for example, for subsequent amplification and transmission. Down tilt determination component 120 may be implemented anywhere on or in communication with base station or eNodeB 100. For instance, down tilt determination component 120 may be, but is not limited to, a component within or associated with a channel card.

In an aspect, waveform analyzer 302 may be configured to receive the one or more input signals 135 and detect any explicitly indicated tilt angle or tilt angle state, and/or the type of waveform indicated or defined by the one or more input signals 135. For example, in an aspect, waveform analyzer 302 may be configured to identify or detect an explicit tilt angle signal or tilt angle state signal, or a portion of one of the one or more input signals 135 that includes an explicit indication of the value of tilt angle or tilt angle state for the waveform. Further, for example, in another aspect without an explicit indication, waveform analyzer 302 may be configured to determine whether the one or more input signals 135 define a non-coordinated waveform, such as a single cell unicast waveform, or a coordinated waveform, such as a multi-cell unicast waveform or a broadcast waveform. Tilt information manager 304 may be configured to maintain values representing the current tilt, and one or more values of tilt angles and/or tilt angle states to be assigned to each waveform type. In some aspects, the one or more input signals 135 explicitly define the tilt angle or tilt angle state corresponding to the waveform. In other aspects, the tilt angle or tilt angle state is determined upon determining the waveform type. For example, each waveform type may be associated with one or more tilt angles or tilt angle states. For instance, tilt information manager 304 may maintain a relational database or a table which relates an identified type of waveform, e.g. coordinated 168 or non-coordinated 170, with respective tilt angle states 172, 174, respectively and/or corresponding tilt angles. Moreover, the tilt angle state or tilt angle for a type of waveform may be further based on one or more other factors, such as times of the day, UE location/geometry, number of cells transmitting, etc. Additionally, the tilt angle state or tilt angle may be different for different subtypes of the same type of waveform, e.g. coordinated for unicast versus coordinated for broadcast, may have different tilt angle states (and hence tilt angle), for example, based on a respective size of the corresponding single frequency network. As described above, different coordinated unicast transmissions may involve different numbers of cells. Each different coordinated unicast transmission may have different tilt angle states (and hence different tilt angles) based on the number of cells. Moreover, the selection of a tilt angle state may be based on the locations/geometry of the UE to receive the transmission. In some aspects, the tilt angle and/or tilt angle state or other related tilt control information may be received at the base station or eNodeB 100 from a network entity, such as a multimedia broadcast multicast service (MBMS) coordination entity (MCE) for coordinated waveforms, for example, or mobility management entity (MME) for non-coordinated waveforms, for example. In some aspects, the BM-SC may indicate the tilt angle and/or tilt angle state or other related tilt control information (for example, for a coordinated waveform) to the MCE through MBMS-GW and MME, and then the MCE may indicate the tilt angle (or tilt angle state or other related tilt control information) to the eNB or base station 100. In some aspects, the tilt angle and/or tilt angle state or other related tilt control information may be received at the base station or eNodeB 100 from the network entity prior to receipt of the one or more inputs signals 135. In other words, in this aspect, base station or eNodeB 100 may be preconfigured with data defining one or more tilt angle states and/or corresponding tilt angles for each type of waveform, and optionally, the additional factors described above.

In an aspect, such as when the tilt angle or tilt angle state is not explicitly included in the one or more input signals 135, an adjustment determiner 306 may be configured to receive the determined waveform type and select the appropriate tilt angle or tilt angle state to be applied based on the waveform type, for example, by referencing tilt information manager 304 and the maintained values representing the one or more tilt angles or tilt angle states assigned to each waveform type.

Further, comparator 308 may be configured to compare the current tilt angle or tilt angle state to the determined tilt angle or tilt angle state to be applied to the transmitted waveform, as explicitly indicated in the one or more input signals 135 as identified by waveform analyzer 302 or as determined based on the one or more input signals 135 by adjustment determiner 306. If the current and determined values differ, comparator 308 may output tilt control signal 122 (FIG. 1) to cause the down tilt of the antenna 110 (FIG. 1) to be adjusted. For example, the tilt control signal 122 may be transmitted to controller 140, causing the controller 140 to implement the requested tilt angle adjustment. In some aspects, adjusting the down tilt comprises adjusting the phase of at least a portion of the waveform to be transmitted. In other aspects, the amplitude of at least a portion of the waveform to be transmitted may be adjusted to achieve the down tilt. In other aspects, both phase and amplitude of at least a portion of the waveform may be adjusted to achieve the desired down tilt angle. For example, in an aspect, adjustments to the phase and/or amplitude of at least a portion of the waveform may be made by adjusting the phase and/or amplitude of at least one antenna coefficient applied to generate the waveform at a subset of a plurality of radiating elements of an array that may define antenna 110.

Figure 3B:
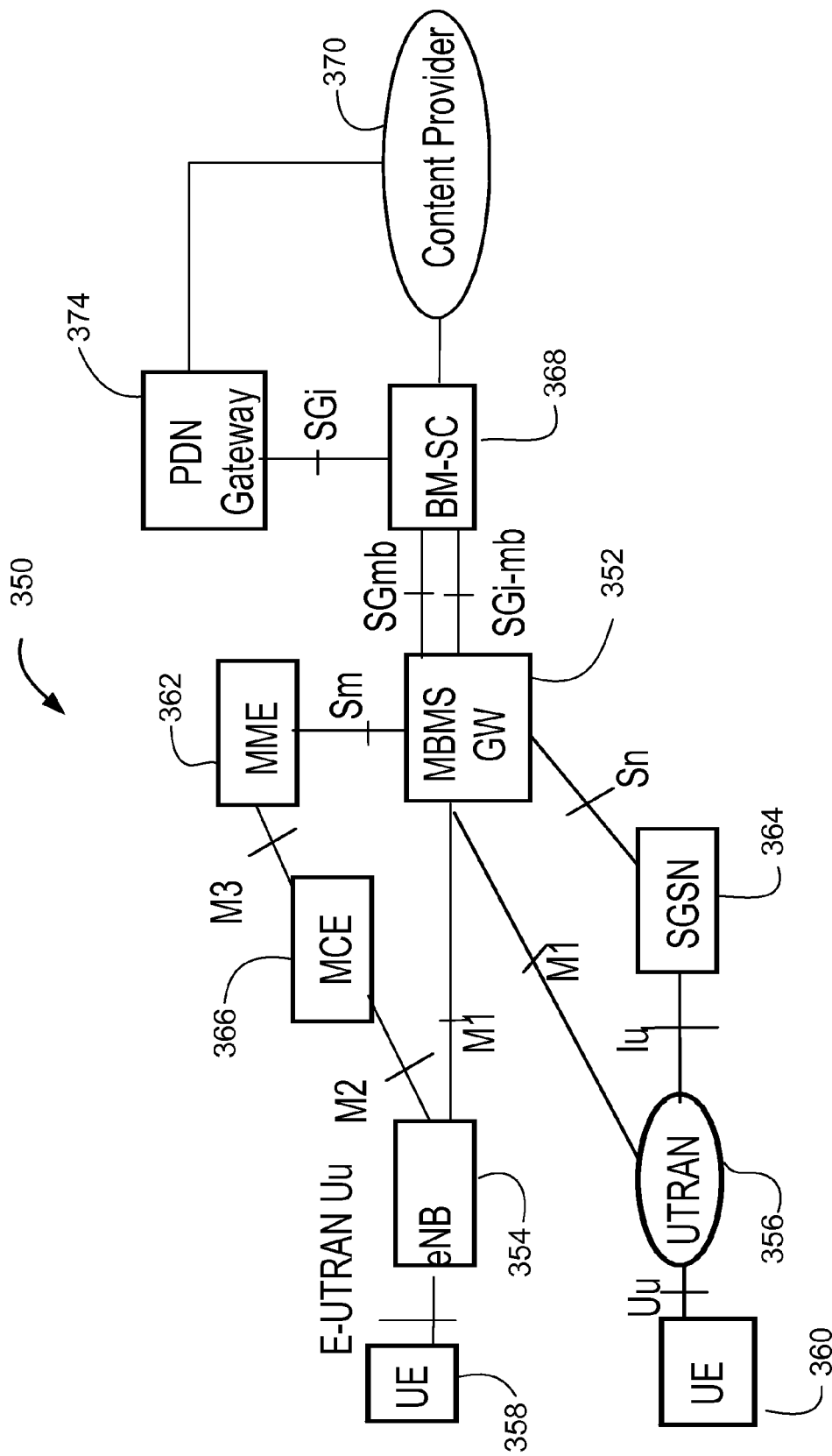
FIG. 3B is a block diagram illustrating components of wireless communication systems for providing or supporting MBSFN service.

FIG. 3B illustrates functional entities of a wireless communication system 350 for providing or supporting MBMS over a Single Frequency Network (MBSFN) service. Regarding Quality of Service (QoS), the system 350 uses a Guaranteed Bit Rate (GBR) type MBMS bearer, wherein the Maximum Bit Rate (MBR) equals the GBR. These components are shown and described by way of example, and do not limit the inventive concepts described herein, which may be adapted to other architectures and functional distributions for delivering and controlling multicast transmissions.

The system 350 may include an MBMS Gate Way (MBMS GW) 352. The MBMS GW 352 controls Internet Protocol (IP) multicast distribution of MBMS user plane data to eNodeBs 354 via an M1 interface; one eNB 354 of many possible eNBs is shown, wherein "M1" refers to a logical interface as described by technical specifications for LTE and related specifications. In addition, the MBMS GW controls IP multicast distribution of MBMS user plane data to UTRAN Radio Network Controllers (RNCs) 356 via an M1 interface; one UTRAN RNC 356 of many possible RNCs is shown. The M1 interface is associated to MBMS data (user plane) and makes use of IP for delivery of data packets. The eNB 354 may provide MBMS content to a UE/mobile entity 358 via an E-UTRAN Uu interface, wherein "Uu" refers to an air interface as described by technical specifications for LTE and related specifications. The RNC 356 may provide MBMS content to a UE mobile entity 360 via a Uu interface. The MBMS GW 352 may further perform MBMS Session Control Signaling, for example MBMS session start and session stop, via the Mobility Management Entity (MME) 362 and Sm interface, wherein "Sm" refers to a logical interface as described by technical specifications for LTE and related specifications. The MBMS GW 352 may further provide an interface for entities using MBMS bearers through the SG-mb (user plane) reference point, and provide an interface for entities using MBMS bearers through the SGi-mb (control plane) reference point, wherein "SG-mb" and "SGI-mb" refer to logical interfaces as described by technical specifications for LTE and related specifications. The SG-mb Interface carries MBMS bearer service specific signaling. The SGi-mb interface is a user plane interface for MBMS data delivery. MBMS data delivery may be performed by IP unicast transmission, which may be a default mode, or by IP multicasting. The MBMS GW 352 may provide a control plane function for MBMS over UTRAN via a Serving General Packet Radio Service Support Node (SGSN) 364 and the Sn/Iu interfaces.

The system 350 may further include a Multicast Coordinating Entity (MCE) 366. The MCE 366 may perform an admission control function for MBMS content, and allocate time and frequency radio resources used by all eNBs in the MBSFN area for multi-cell MBMS transmissions using MBSFN operation. The MCE 366 may determine a radio configuration for an MBSFN Area, such as, for example, the modulation and coding scheme. The MCE 366 may schedule and control user plane transmission of MBMS content, and manage eMBMS service multiplexing, by determining which services are to be multiplexed in which Multicast Channel (MCH). The MCE 366 may participate in MBMS Session Control Signaling with the MME 362 through an M3 interface, and may provide a control plane interface M2 with the eNB 352, wherein "M2" and "M3" refer to logical interfaces as described by technical specifications for LTE and related specifications.

The system 350 may further include a Broadcast-Multicast Service Center (BM-SC) 368 in communication with a content provider server 370. The BM-SC 368 may handle intake of multicast content from one or more sources such as the content provider 370, and provide other higher-level management functions as described below. These functions may include, for example, a membership function, including authorization and initiation of MBMS services for an identified UE. The BM-SC 368 may further perform MBMS session and transmission functions, scheduling of live broadcasts, and delivery, including MBMS and associated delivery functions. The BM-SC 368 may further provide service advertisement and description, such as advertising content available for multicast. A separate Packet Data Protocol (PDP) context may be used to carry control messages between a UE and a BM-SC. The BM-SC may further provide security functions such as key management, manage charging of content providers according to parameters such as data volume and QoS, provide content synchronization for MBMS in UTRAN and in E-UTRAN for broadcast mode, and provide header compression for MBSFN data in UTRAN. The BM-SC 368 may indicate session start, update and stop to the MBMS-GW 352 including session attributes such as QoS and MBMS service area.

The system 350 may further include a Multicast Management Entity (MME) 362 in communication with the MCE 366 and MBMS-GW 352. The MME 362 may provide a control plane function for MBMS over E-UTRAN. In addition, the MME may provide the eNB 354 with multicast related information defined by the MBMS-GW 352. An Sm interface between the MME 362 and the MBMS-GW 352 may be used to carry MBMS control signaling, for example, session start and stop signals.

The system 350 may further include a Packet Data Network (PDN) Gate Way (GW) 374, sometimes abbreviated as a P-GW. The P-GW 374 may provide an Evolved Packet System (EPS) bearer between the UE 358 and BM-SC 368 for signaling and/or user data. As such, the P-GW may receive Uniform Resource Locator (URL) based requests originating from UEs in association with IP addresses assigned to the UEs. The BM-SC 368 may also be linked to one or more content providers via the P-GW 374, which may communicate with the BM-SC 368 via an IP interface.

Figure 4:
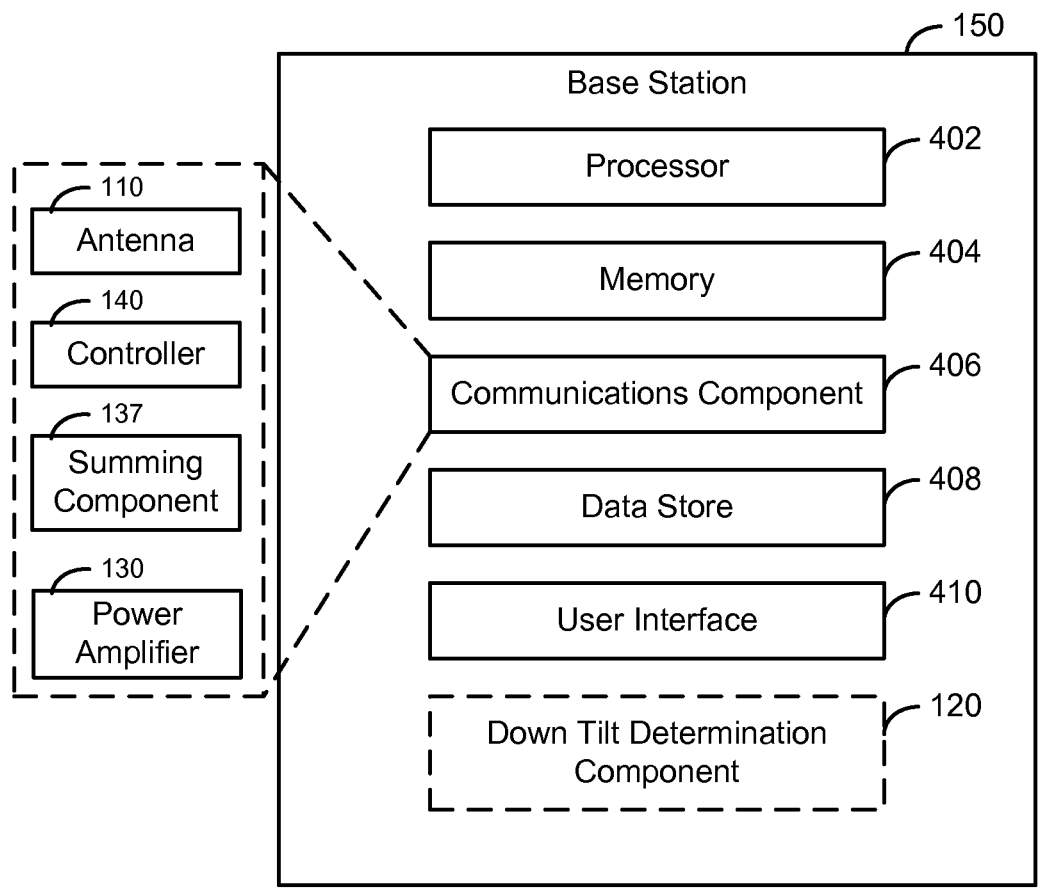
FIG. 4 schematic block diagram of an aspect of a base station or eNodeB.

Referring to FIG. 4, in one aspect, base station 100 (FIG. 1) may include a processor 402 for carrying out processing functions associated with one or more of the components and functions described herein. Processor 402 can include a single or multiple set of processors or multi-core processors. Moreover, processor 402 can be implemented as an integrated processing system and/or a distributed processing system.

Base station 100 further includes a memory 404, such as for storing data used herein and/or local versions of applications being executed by processor 402. Memory 404 can include any type of memory usable by a computer, such as random access memory (RAM), read only memory (ROM), tapes, magnetic discs, optical discs, volatile memory, non-volatile memory, and any combination thereof.

Further, base station 100 may include a communications component 406 that provides for establishing and maintaining communications with one or more devices utilizing hardware, software, and services as described herein. Communications component 406 may carry communications between components on base station 100, as well as between base station 100 and external devices, such as devices located across a communications network and/or devices serially or locally connected to base station 100. For example, communications component 406 may include one or more buses, and may further include transmit chain components and receive chain components associated with a transmitter and receiver, respectively, operable for interfacing with external devices. Communications component 406 may also include, for example, power amplifier 130, summing component 137, controller 140 and antenna 110, described above with respect to FIGS. 1, 2, and 3. Communications component 406 may be configured to receive input signals 135 from a network component (e.g., MCE 366, MME 362, or BM-SC 368 (FIG. 3B))

over a backhaul connection, and/or wirelessly via antenna 110 and/or other receive chain components.

Additionally, base station 100 may further include a data store 408, which can be any suitable combination of hardware and/or software, that provides for mass storage of information, databases, and programs employed in connection with aspects described herein. For example, data store 408 may be a data repository for applications, such as down tilt determination component 120 not currently being executed by processor 402.

Base station 100 may additionally include a user interface component 410 operable to receive inputs from a user of base station 100, and further operable to generate outputs for presentation to the user. User interface component 410 may include one or more input devices, including but not limited to a keyboard, a number pad, a mouse, a touch-sensitive display, a navigation key, a function key, a microphone, a voice recognition component, a camera, and/or any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

Additionally, in some aspects, base station 100 may include a down tilt determination component 120, for instance located within a channel card or optionally anywhere in communication with base station 100 (as illustrated by the dashed line component within base station 100). As noted above, down tilt determination component 120 may be configured to implement the functions described above with respect to FIGS. 1, 2, and 3.

Figure 5:
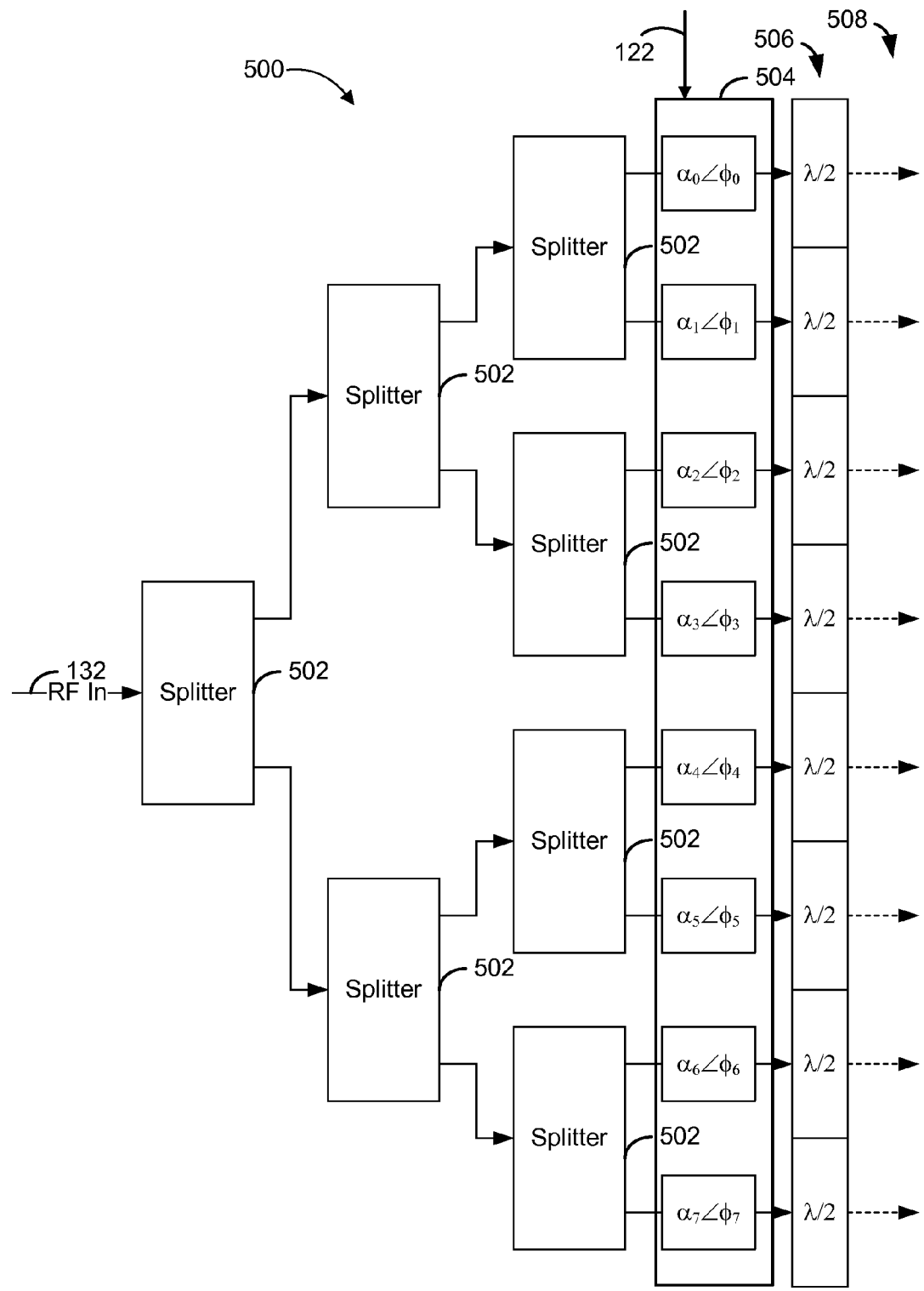
FIG. 5 is a schematic diagram of an aspect of a phase and/or amplitude adjuster.

FIG. 5 depicts an exemplary transmit antenna array 500 having tilt control applied thereto based on waveform type. It should be noted that antenna array 500 is merely one example of an implementation of the teachings described herein, and that other configurations are possible. As depicted in FIG. 5 RF signal 132 may be received. The RF signal 132 may be split using one or more splitters 502 such that the signal can be radiated via a plurality of antenna elements 506 to generate waveform 508. Prior to being radiated, the RF signals may pass through shifters 504, which may be configured to vary one or more antenna coefficients to vary phase and/or amplitude of the radiated signal. Tilt control signal 122, determined as described above with respect to FIGS. 1, 2, and 3, may have different components with different shift adjustments that may be applied to each of the shifters 504 such that the phase and/or amplitude is varied in accordance with the type of signal to be radiated to achieve the desired down tilt angle in the transmitted waveform.

Figure 6:
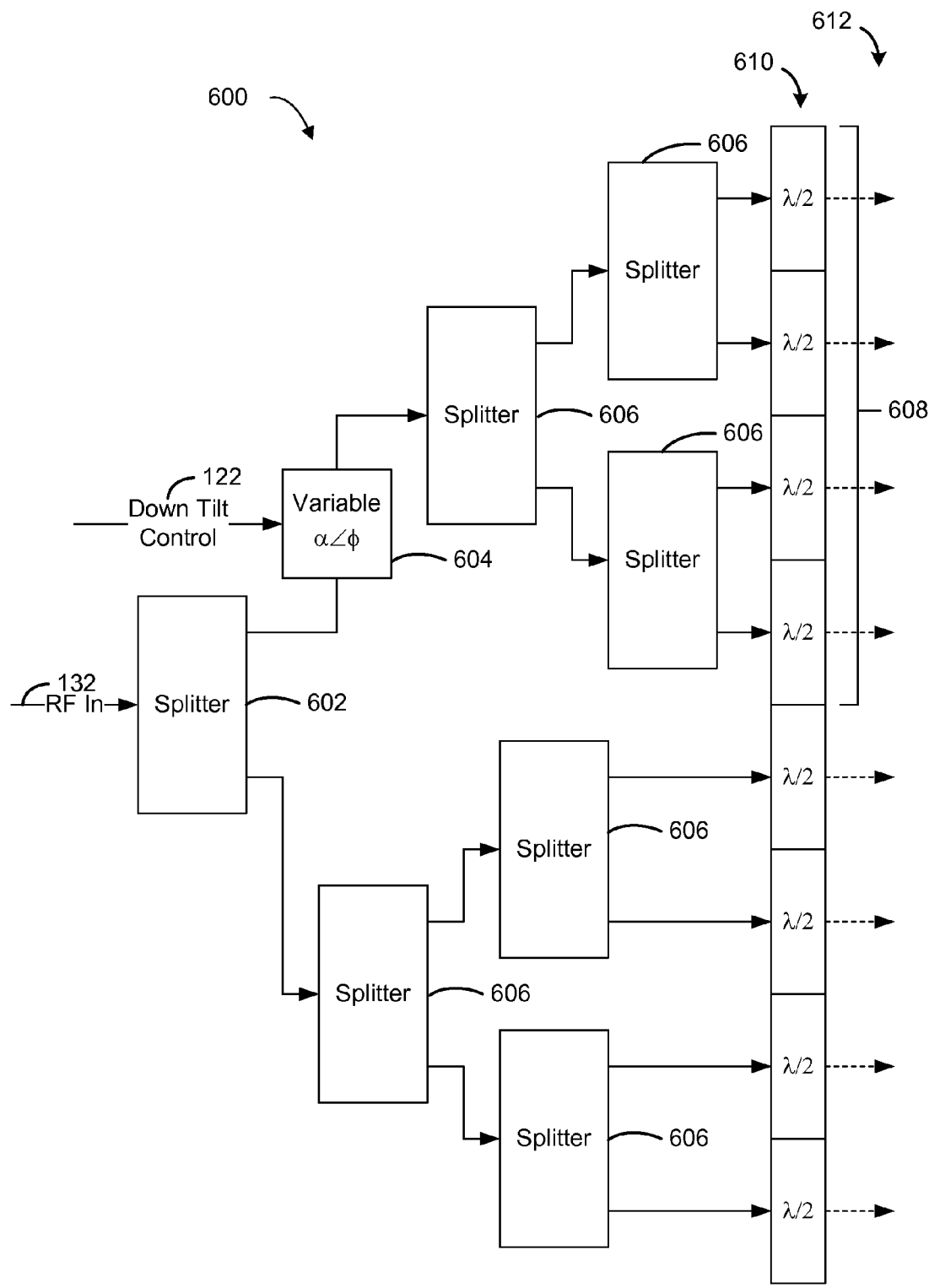
FIG. 6 is a schematic diagram of another aspect of a phase and/or amplitude adjuster.

FIG. 6 depicts another exemplary transmit antenna array 600 having tilt control applied thereto based on waveform type. Again, it should be noted that antenna array 600 is merely one example of an implementation of the teachings described herein, and that other configurations are possible. As in FIG. 5, RF signal 132 may be received, for example, at antenna controller 140. The RF signal 132 may then be split into two paths via a first splitter 602. Further, tilt control signal 122 may be applied via shifter 604 to alter the phase and/or amplitude of a subset 608, e.g. half in this case, of a plurality of antenna elements 610 that define antenna array 600. It is noted that the placement of shifter 604 is merely exemplary and other placements are possible. The signals output from first splitter 602 and shifter 604 may then traverse additional splitters 606 prior to being radiated via corresponding ones of the plurality of antenna elements 610. Accordingly, only a portion, e.g. subset 608, of the plurality of antenna elements 610 defining antenna 600 may have down tilt control signal 122 applied, and in some aspect the same phase or amplitude adjustment, or both, may be applied to subset 608 of antenna elements 610 to achieve the desired down tilt in the transmitted waveform 612.

Figure 7:
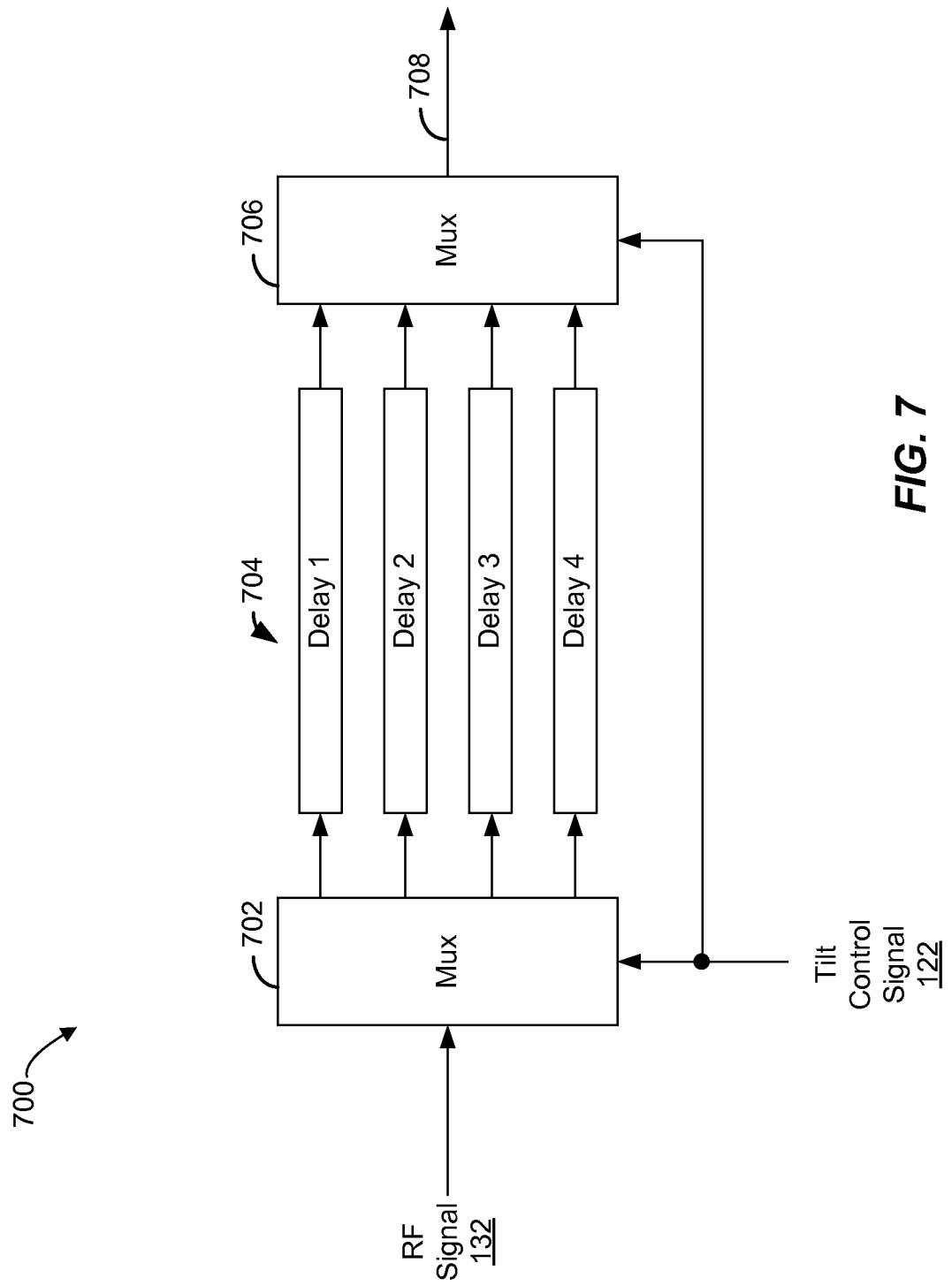
FIG. 7 is a schematic diagram of another aspect of a phase and/or amplitude adjuster.

FIG. 7 depicts a switched delay phase shifter 700 which may be used to vary the amplitude or phase of one or more antenna coefficients. As shown in FIG. 7, RF signal 132 may be passed through multiplexer 702 to generate a plurality of signals, each traversing a respective one of a plurality of delay circuits 704, each of which may cause an adjusted phase and/or amplitude corresponding to a respective one of a plurality of tilt angles or title angle states. Tilt control signal 122 is input to multiplexer 702 and to multiplexer 706, which receives the outputs of delay circuits 704 and selects one of the plurality of outputs to use as an adjusted signal 708 to be radiated by the antenna to produce the desired down tilt.

Figure 8:
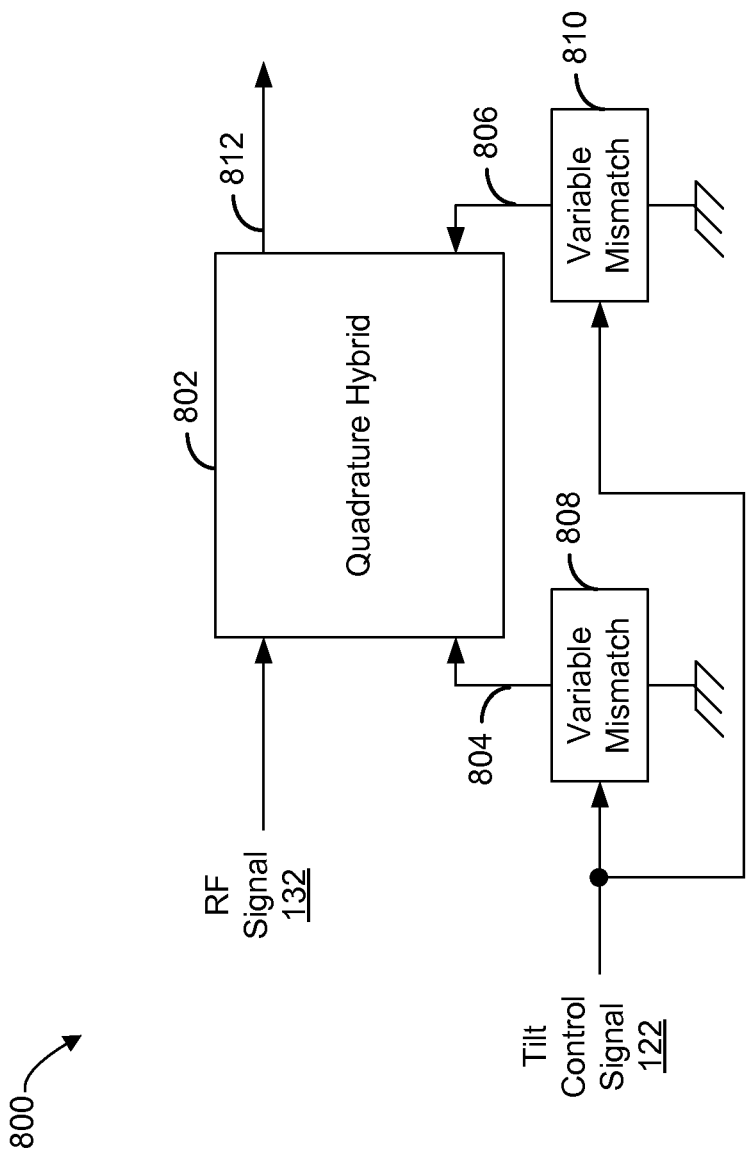
FIG. 8 is a schematic diagram of yet another aspect of a phase and/or amplitude adjuster.

FIG. 8 depicts another phase shifter 800 that may be used to vary the amplitude or phase of one or more antenna coefficients. As shown in FIG. 8, RF signal 132 is received at a quadrature hybrid component 802, which acts as a no loss variable phase (or amplitude) block. Two adjusted control signals 804 and 806 are also received at quadrature hybrid component 802 after tilt control signal 122 respectively passes through variable mismatch components 808 and 810. The state of adjusted control signals 804 and 806 may be used by quadrature hybrid component 802 to determine the phase (or amplitude) adjustment. Quadrature hybrid component 802 generates an adjusted transmission signal 812 for generating the waveform with the desired tilt angle.

Figure 9:
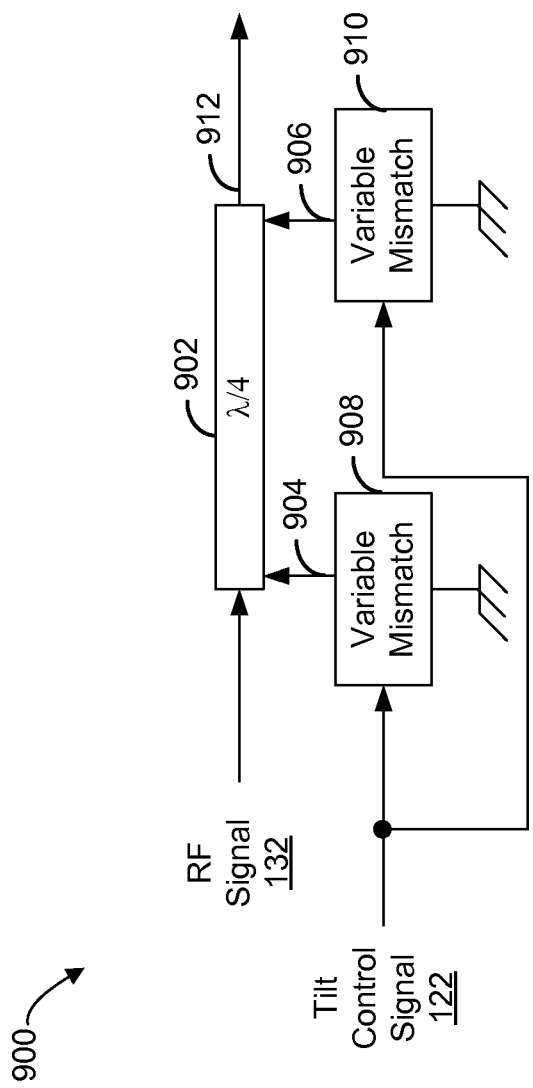
FIG. 9 is a schematic diagram of an additional aspect of a phase and/or amplitude adjuster.

FIG. 9 depicts a quarter wave phase shifter 900 that may be used to vary the amplitude or phase of one or more antenna coefficients. As shown in FIG. 9, RF signal 132 is received at phase shifter component 902, which is a quarter wavelength phase shifter in this case. Phase shifter component 902 also receives adjusted control signals 904 and 906 after control signal 122 respectively passes through variable mismatch components 908 and 910. The state of adjusted control signals 804 and 806 may be used by phase shifter component 902 to determine the phase (and/or amplitude) adjustment. Phase shifter component 902 generates an adjusted transmission signal 912 for generating the waveform with the desired tilt angle.

Figure 10:
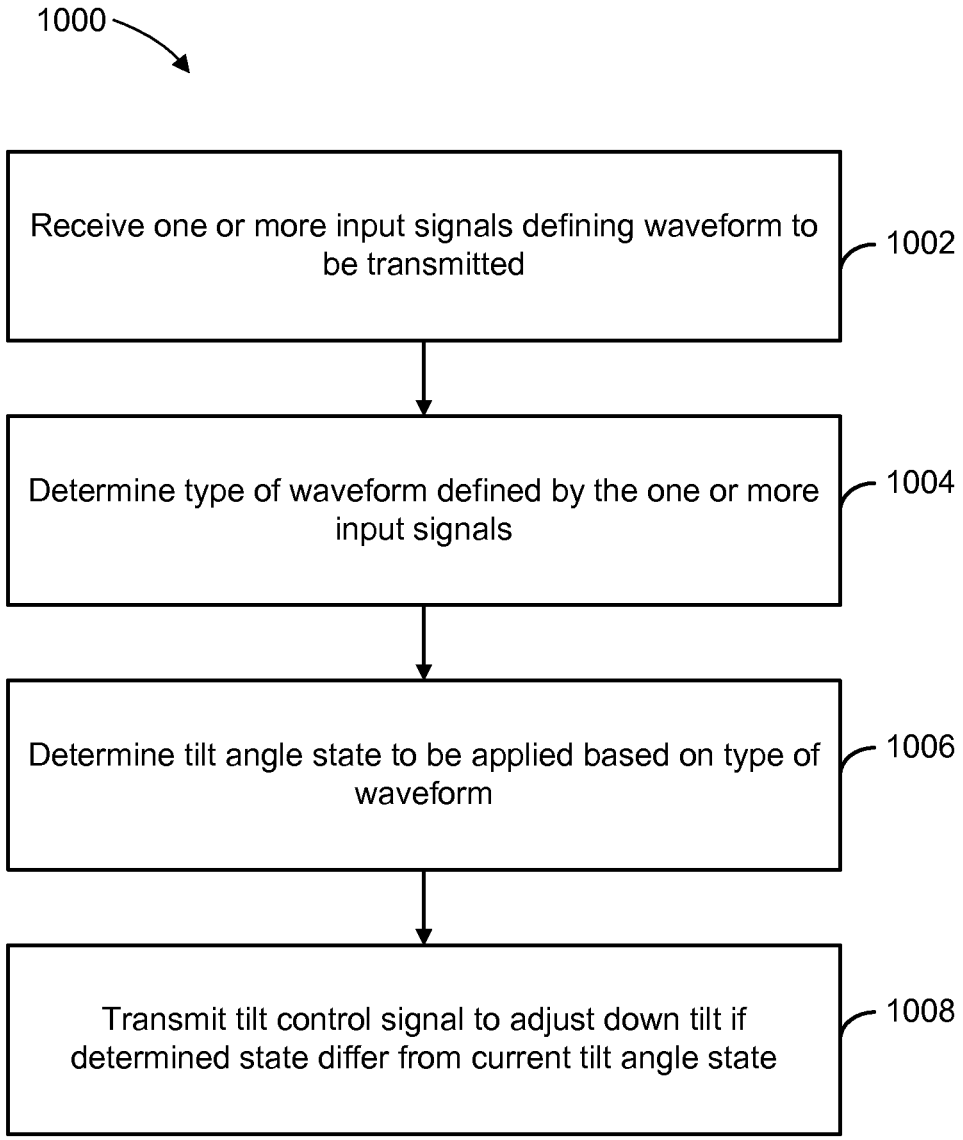
FIG. 10 is a flowchart illustrating an aspect of a method for controlling antenna down tilt.

Referring now to FIG. 10, a method 1000 is shown for controlling antenna down tilt in a mixed coordinated/non-coordinated network, in accordance with some aspects. Method 1000 may be implemented, for example, by a bases station such as base station 100 shown in FIG. 1. As depicted at 1002, the base station may receive one or more input signals defining a waveform to be transmitted. As shown at 1004, the base station may determine a type of the waveform defined by the one or more input signals. For example, in some aspects, the one or more signals may define the type of physical layer waveform upon which data should be transmitted. The input signals may define, for example, a single-cell unicast waveform, a multi-cell SFN unicast waveform, or a broadcast SFN waveform.

As shown at 1006, the base station may determine a tilt angle state to be applied to an antenna based on the type of waveform defined by the one or more input signals. For example, the base station may be configured to select a tilt angle state among at least one tilt angle state assigned to each waveform type. As shown at 1008, a tilt control signal may be transmitted if the determined tilt angle state differs from a current tilt angle state associated with the antenna.

Figure 11:
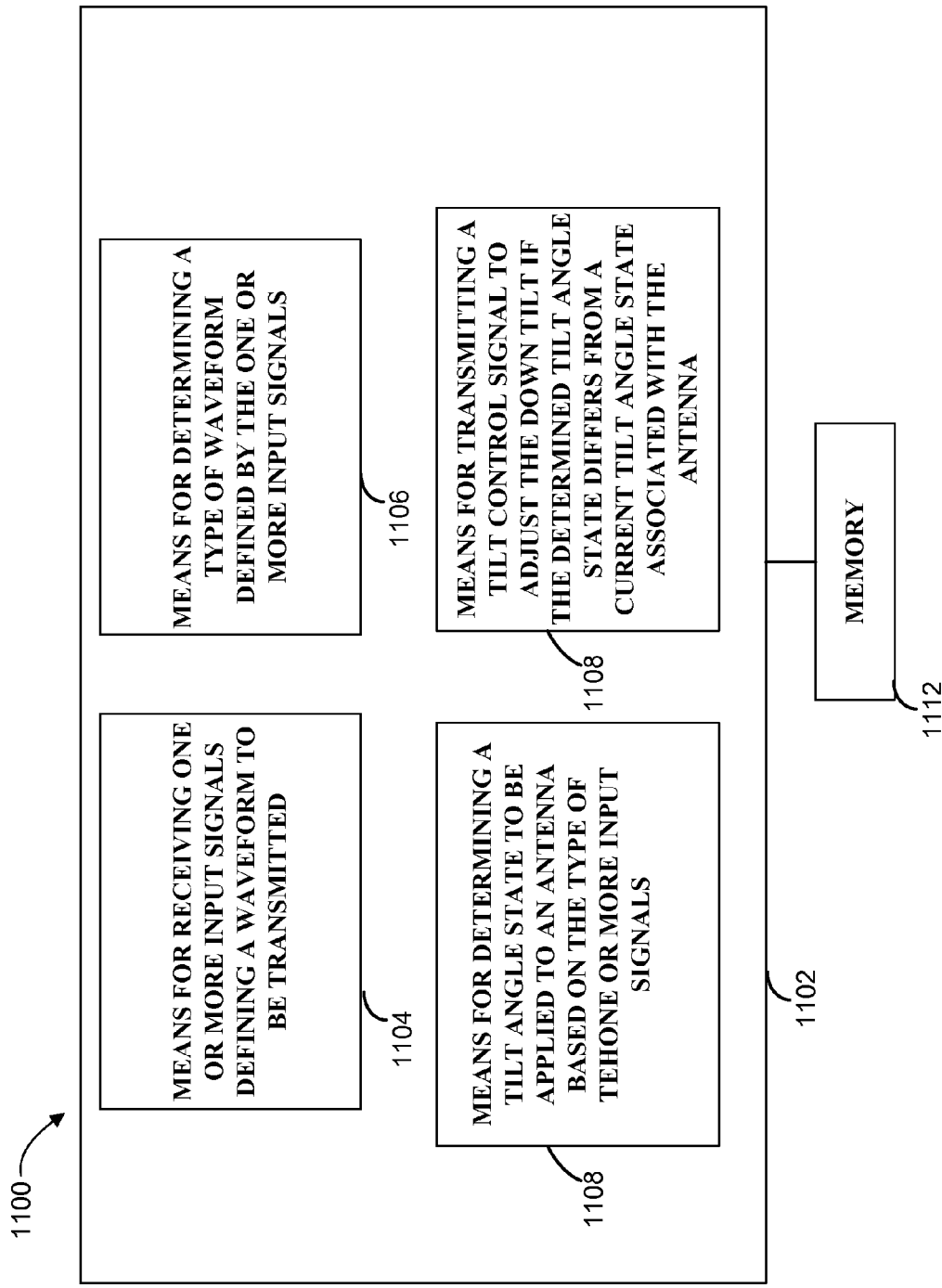
FIG. 11 is a schematic block diagram of an aspect of an apparatus for controlling antenna down tilt.

Referring to FIG. 11, an apparatus 1100 that controls antenna down tilt in a mixed coordinated/non-coordinated network can reside at least partially within base station 100. It is to be appreciated that apparatus 1100 is represented as including functional blocks, which can represent functions implemented by a processor, hardware, software, or combination thereof (e.g., firmware). As such, apparatus 1100 includes a logical grouping 1102 of electrical components that can act in conjunction. For instance, logical grouping 1102 can include means for receiving one or more input signals defining a waveform to be transmitted (Block 1104). For example, in an aspect, the means 1104 can include communications component 406 receiving one or more input signals from an MCE or MME, and/or or processor 402. Further, logical grouping 1102 can include means for determining a type of waveform defined by the one or more input signals (Block 1106). In an aspect, the means 1106 may be implemented by waveform analyzer 302 and/or processor 402. Logical grouping 1102 may also include means for determining a tilt angle state to be applied to the antenna based on the one or more input signals (Block 1108). For example, in an aspect, the means 1108 can include tilt adjustment determiner 306 and/or processor 402. Also, logical grouping 1102 can include means for transmitting a tilt control signal if the determined tilt angle state differs from a current tilt angle state associated with the antenna (Block 1110). For example, in an aspect, the means 1110 can include comparator 308, controller 140, and/or processor 402.

Additionally, apparatus 1100 can include a memory 1112 that retains instructions for executing functions associated with electrical components 1104-1110. While shown as being external to memory 1112, it is to be understood that one or more of electrical components 1104-1110 can exist within memory 1112. In an aspect, for example, memory 1112 may be the same as or similar to memory 404 or data store 408 (FIG. 4).

Referring to FIG. 12, a table 1200 includes results from a simulation that illustrates that network capacity may be improved by adjusting down tilt angle based on the transmitted waveform, such as described above for the present aspects. The simulation included a 19 site flat model, where sites were classified into three (3) rings. The center ring (or the center eNodeB) had one site (or 3 cells). The middle ring had 6 sites (or 18 cells). The outer ring had 12 sites (or 36 cells). In this simulation, all UEs were uniformly dropped only in 3 cells of the center ring.

Applying the apparatus and methods described herein, one can obtain higher supportable data rates at a physical layer as illustrated in Table 1200.

The simulation results for coordinated waveforms with non-coordinated antenna down tilt are in general smaller than those without antenna down tilt, e.g. with coordinated down tilt or in other words less down tilt than non-coordinated down tilt. It is noted that the results in the D1 case indicate that a large degree of antenna down tilt can significantly reduce the system performance. Therefore, it may be preferred to switch off antenna down tilt or adjust the down tilt angle to a smaller coordinated down tilt angle, whenever a coordinated packet, such as an eMBMS subframe, is in transmission. The simulation results also show that the maximum data rate is generally better for rural areas (or low suburban areas) than for urban and suburban areas as the transmitted signals in the rural case may have a lower penetration loss and a smaller propagation loss.

Additionally, when an eMBMS service area comprises only coordinated transmissions, it is of interest to know how cell size changes impact the system performance at the center site. Table 1200 provides the simulation results of received packet SNR (signal to interference plus noise ratio) distributions from all UEs in the system. The distributions provide a general view of how SNR are compared among different cell size cases, however, they are different from SNR distributions of each individual UEs. In summary, a service area having only coordinated transmissions in general has significantly higher maximum data rate in dense urban area with smaller cell size (typically less than 500 m). As the cell size increases, the maximum data rate decreases except in a rural area. Based on the analyzed propagation model, a rural area may have higher maximum data rate than that of urban or suburban areas.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for controlling antenna down tilt in a mixed coordinated/non-coordinated network including at least one base station that mixes transmissions of coordinated signals that are synchronized with one or more adjacent base stations and transmissions of non-coordinated signals that are not synchronized with the one or more adjacent base stations, the method comprising:

receiving by the at least one base station, one or more input signals defining a waveform to be transmitted via an antenna of the at least one base station;

determining a type of the waveform defined by the one or more input signals, comprising determining whether one of the one or more input signals is a single-cell unicast waveform, a multi-cell single frequency network (SFN) unicast waveform, or a broadcast SFN waveform;

determining a tilt angle state to be applied to the antenna based on the type of the waveform in response to receiving tilt control information from a network control entity, wherein the tilt control information comprises a timing and a down tilt state received or derived from at least one of a multimedia broadcast multicast service coordination entity or a mobility management entity; and transmitting a tilt control signal to adjust the down tilt of the angle if the determined tilt angle state differs from a current tilt angle state associated with the antenna.

2. The method of claim 1, wherein the one or more input signals explicitly define the tilt angle state corresponding to the waveform.

3. The method of claim 1, wherein the one or more input signals define the type of physical layer waveform upon which data is to be transmitted.

4. The method of claim 1, wherein determining the tilt angle state to be applied further comprises retrieving a stored tilt angle state corresponding to the determined type.

5. The method of claim 1, wherein each type of waveform corresponds to a different tilt angle state.

6. The method of claim 1, wherein determining the tilt angle state to be applied comprises selecting a tilt angle state among at least one tilt angle state assigned to each waveform type.

7. The method of claim 1, wherein the multi-cell SFN unicast waveform and the broadcast SFN waveform comprise coordinated waveforms.

8. The method of claim 1, wherein the waveform comprises a plurality of different channels in a plurality of different time slots, and wherein adjusting the down tilt state of the antenna further comprises changing the down tilt state between each of two successive time slots having different determined waveform types corresponding to different determined antenna tilt angle states.

9. The method of claim 1, wherein the one or more input signals represent a plurality of different waveforms to be transmitted in a time period, and wherein transmitting the tilt control signal further comprises transmitting a plurality of tilt control signals comprising a sequence of tilt angle states corresponding to each of the plurality of different waveforms, and wherein the method further comprises:
   adjusting the down tilt of the antenna over the time period based on the sequence of tilt angle states in the plurality of tilt control signals.

10. The method of claim 9, wherein adjusting the down tilt of the antenna further comprises changing the down tilt a plurality of times in less than 1 hour.

11. The method of claim 9, wherein adjusting the down tilt of the antenna further comprises changing the down tilt a plurality of times in less than 1 minute.

12. The method of claim 9, wherein adjusting the down tilt of the antenna further comprises changing the down tilt a plurality of times in less than 1 second.

13. The method of claim 9, wherein the tilt control signal comprises a control signal for adjusting a transmission phase of a portion of the waveform.

14. The method of claim 13, wherein the antenna comprises an antenna array, and wherein adjusting the transmission phase of the portion of the waveform comprises adjusting the phase of a subset of a plurality of antenna coefficients corresponding to a subset of the antenna array.

15. The method of claim 1, wherein the antenna comprises an antenna array having a plurality of antenna array elements, and wherein the tilt control signal comprises a control signal for adjusting a transmission phase of the waveform for at least one of the plurality of antenna array elements.

16. The method of claim 1, wherein the antenna comprises an antenna array having a plurality of antenna array elements, and wherein the tilt control signal comprises a control signal for adjusting a transmission amplitude of the waveform for at least one of the plurality of antenna array elements.

17. The method of claim 1, wherein the antenna comprises an antenna array having a plurality of antenna array elements, and wherein the tilt control signal comprises a control signal for adjusting a transmission phase and a transmission amplitude of the waveform for at least one of the plurality of antenna array elements.

18. The method of claim 1, further comprising determining a sub-type of the waveform, wherein the tilt angle state for a same type of the waveform varies depending on the sub-type of the waveform.

19. The method of claim 18, wherein the type of the waveform comprises a coordinated type, and wherein the sub-type of the waveform comprises a unicast sub-type or a broadcast sub-type.

20. The method of claim 1, wherein determining the tilt angle state is further based on a size of the network, wherein the tilt angle state for a same type of the waveform varies depending on the size of the network.

21. The method of claim 1, wherein determining the tilt angle state is further based on a time of day, wherein the tilt angle state for a same type of the waveform varies depending on the time of day.

22. The method of claim 1, further comprising:
   adjusting the down tilt of the antenna based on the tilt control signal.

23. The method of claim 22, wherein the antenna comprises an antenna array having a plurality of antenna array elements, wherein adjusting the down tilt of the antenna comprises applying the control signal to a switched delay phase shifter for adjusting the phase of the waveform for at least one of the plurality of array elements.

24. The method of claim 22, wherein the antenna comprises an antenna array having a plurality of antenna array elements, wherein adjusting the antenna comprises applying the control signal to a hybrid based phase shifter for adjusting the phase of the waveform for at least one of the plurality of array elements.

25. The method of claim 22, wherein the antenna comprises an antenna array having a plurality of antenna array elements, wherein adjusting the antenna comprises applying the control signal to a quarter wavelength phase shifter for adjusting the phase of the waveform for at least one of the plurality of array elements.

26. An apparatus for controlling antenna down tilt in a mixed coordinated/non-coordinated network including at least one base station that mixes transmissions of coordinated signals that are synchronized with one or more adjacent base stations and transmissions of non-coordinated signals that are not synchronized with the one or more adjacent base stations, the apparatus comprising:
   at least one processor configured to:
      receive, by the at least one base station, one or more input signals defining a waveform to be transmitted via an antenna of the at least one base station;
      determine a type of the waveform defined by the one or more input signals, comprising determining whether one of the one or more input signals is a single-cell unicast waveform, a multi-cell single frequency network (SFN) unicast waveform, or a broadcast SFN waveform;
      determine a tilt angle state to be applied to the antenna based on the type of the waveform defined by the one or more input signals in response to receiving tilt control information from a network control entity, wherein the tilt control information comprises a timing and a down tilt state received or derived from at least one of a multimedia broadcast multicast service coordination entity or a mobility management entity; and compare a current tilt angle state associated with the antenna to the determined tilt angle state, and transmit a tilt control signal to adjust the down tilt of the angle if the current tilt angle state and the determined tilt angle state differ; and a memory coupled to the at least one processor.

27. The apparatus of claim 26, wherein the one or more input signals explicitly define the tilt angle state corresponding to the waveform.

28. The apparatus of claim 26, wherein the processor is further configured to retrieve a stored tilt angle corresponding to the determined type.

29. The apparatus of claim 26, wherein each type of waveform corresponds to a different tilt angle state.

30. The apparatus of claim 26, wherein the processor is further configured to select a tilt angle among at least one tilt angle state assigned to each waveform type.

31. The apparatus of claim 26, wherein the multi-cell SFN unicast waveform and the broadcast SFN waveform comprise coordinated waveforms.

32. The apparatus of claim 26, wherein the waveform comprises a plurality of different channels in a plurality of different time slots, and wherein the processor is further configured to change the down tilt state between each of two successive time slots having different determined waveform types corresponding to different determined tilt angle states.

33. The apparatus of claim 26, wherein the one or more input signals represent a plurality of different waveforms to be transmitted in a time period, and wherein the processor is further configured to transmit a plurality of tilt control signals comprising a sequence of tilt angle states corresponding to each of the plurality of different waveforms, and to adjust the down tilt of the antenna over the time period based on the sequence of tilt angle states in the plurality of tilt control signals.

34. The apparatus of claim 33, wherein the tilt control signal comprises a control signal for adjusting a transmission phase of a portion of the waveform.

35. The apparatus of claim 34, wherein the antenna comprises an antenna array, and wherein the processor is further configured to adjust the phase of a subset of a plurality of antenna coefficients corresponding to a subset of the antenna array.

36. The apparatus of claim 26, wherein the antenna comprises an antenna array having a plurality of antenna elements, and wherein the tilt control signal comprises a control signal for adjusting a transmission phase of the waveform for at least one of the plurality of antenna array elements.

37. The apparatus of claim 26, wherein the antenna comprises an antenna array having a plurality of antenna array elements, and wherein the tilt control signal comprises a control signal for adjusting a transmission amplitude of the waveform for at least one of the plurality of antenna array elements.

38. The apparatus of claim 26, wherein the antenna comprises an antenna array having a plurality of antenna array elements, and wherein the tilt control signal comprises a control signal for adjusting a transmission phase and a transmission amplitude of the waveform for at least one of the plurality of antenna array elements.

39. The apparatus of claim 26, wherein the processor is further configured to determine a sub-type of the waveform, wherein the tilt angle state for a same type of waveform varies depending on the sub-type of the waveform.

40. The apparatus of claim 39, wherein the type of waveform comprises a coordinated type, and wherein the sub-type of the waveform comprises a unicast sub-type or a broadcast sub-type.

41. The apparatus of claim 26, wherein the processor is further configured to determine the tilt angle state based on a size of the network, wherein the tilt angle state for a same type of the waveform varies depending on the size of the network.

42. The apparatus of claim 26, wherein the processor is further configured to determine the tilt angle state based on a time of day, wherein the tilt angle state for a same type of waveform varies depending on the time of day.

43. The apparatus of claim 26, wherein the processor is further configured to adjust the down tilt of the antenna based on the tilt control signal.

44. The apparatus of claim 43, wherein the antenna comprises an antenna array having a plurality of antenna array elements, and wherein the processor is configured to apply the tilt control signal to a switched delay phase shifter for adjusting the phase of the waveform for at least one of the plurality of array elements.

45. The apparatus of claim 43, wherein the antenna comprises an antenna array having a plurality of antenna array elements, and wherein the processor is configured to apply the tilt control signal to a hybrid based phase shifter for adjusting the phase of the waveform for at least one of the plurality of array elements.

46. The apparatus of claim 43, wherein the antenna comprises an antenna array having a plurality of antenna array elements, and wherein the processor is configured to apply the tilt control signal to a quarter wave phase shifter for adjusting the phase of the waveform for at least one of the plurality of array elements.

47. A non-transitory computer readable medium, comprising:

at least one instruction for causing a computer of at least one base station to receive one or more input signals defining a waveform to be transmitted via an antenna of the at least one base station;

at least one instruction for causing the computer to determine a type of the waveform defined by the one or more input signals, comprising determining whether one of the one or more input signals is a single-cell unicast waveform, a multi-cell single frequency network (SFN) unicast waveform, or a broadcast SFN waveform;

at least one instruction for causing the computer to determine a tilt angle state to be applied to the antenna based on the type of the waveform defined by the one or more input signals in response to receiving tilt control information from a network control entity, wherein the tilt control information comprises a timing and a down tilt state received or derived from at least one of a multimedia broadcast multicast service coordination entity or a mobility management entity; and at least one instruction for causing the computer to compare a current tilt angle state associated with the antenna to the determined tilt angle state, and transmit a tilt control signal to adjust the down tilt of the angle if the current tilt angle state and the determined tilt angle state differ.

48. An apparatus of at least one base station, the apparatus comprising:

means for receiving one or more input signals defining a waveform to be transmitted via an antenna of the at least one base station;

means for determining a type of the waveform defined by the one or more input signals, comprising determining whether one of the one or more input signals is a single-cell unicast waveform, a multi-cell single frequency network (SFN) unicast waveform, or a broadcast SFN waveform;

means for determining a tilt angle state to be applied to the antenna based on the type of the waveform defined by the one or more input signals in response to receiving tilt control information from a network control entity, wherein the tilt control information comprises a timing and a down tilt state received or derived from at least one of a multimedia broadcast multicast service coordination entity or a mobility management entity; and means for transmitting a tilt control signal to adjust the down tilt of the angle if the determined tilt angle state differs from a current tilt angle state associated with the antenna.

* * * * *